(12) United States Patent
Polkhovskiy

(10) Patent No.: US 7,918,037 B1
(45) Date of Patent: Apr. 5, 2011

(54) TAPE MEASURE ENDPIECE

(76) Inventor: Nikolay Polkhovskiy, Whitesboro, NY (US)

( * ) Notice: Subject to any disclaimer, the term of this patent is extended or adjusted under 35 U.S.C. 154(b) by 0 days.

(21) Appl. No.: 12/718,344

(22) Filed: Mar. 5, 2010

(51) Int. Cl.
*G01B 3/10* (2006.01)
(52) U.S. Cl. ............................................ 33/758; 33/770
(58) Field of Classification Search .................... 33/757, 33/758, 768, 770
See application file for complete search history.

(56) References Cited

U.S. PATENT DOCUMENTS

| 1,786,845 | A | * | 12/1930 | Hippie | ........................... | 33/758 |
| 2,629,935 | A | * | 2/1953 | Roe | ................. | 33/770 |
| 3,913,232 | A | | 10/1975 | Marcell | | |
| 3,913,233 | A | | 10/1975 | Marcell | | |
| 3,965,579 | A | | 6/1976 | Woods | | |
| 5,600,894 | A | | 2/1997 | Blackman et al. | | |
| 5,845,412 | A | | 12/1998 | Arcand | | |
| 5,894,677 | A | | 4/1999 | Hoffman | | |
| 6,108,926 | A | | 8/2000 | Fraser et al. | | |
| 6,115,931 | A | | 9/2000 | Arcand | | |
| 6,442,863 | B1 | | 9/2002 | Poineau et al. | | |
| 6,546,644 | B2 | | 4/2003 | Poineau et al. | | |
| 6,637,126 | B2 | | 10/2003 | Balota | | |
| 6,931,753 | B2 | | 8/2005 | Ryals et al. | | |
| 7,055,260 | B1 | | 6/2006 | Hoffman | | |
| 7,181,860 | B1 | * | 2/2007 | Umholtz | ........................ | 33/758 |
| 7,185,446 | B1 | | 3/2007 | King | | |
| 7,266,905 | B1 | * | 9/2007 | Lee | ................................. | 33/758 |
| 7,281,340 | B2 | | 10/2007 | Greally | | |
| 7,434,330 | B2 | | 10/2008 | McEwan et al. | | |
| 7,596,881 | B1 | | 10/2009 | Bourgeois | | |
| 7,627,958 | B2 | | 12/2009 | Tallon et al. | | |
| 7,669,347 | B1 | * | 3/2010 | Huang | ........................... | 33/758 |
| 2003/0226274 | A1 | | 12/2003 | Lin | | |
| 2005/0011082 | A1 | * | 1/2005 | Smith | ............................ | 33/758 |
| 2005/0115097 | A1 | | 6/2005 | Tallon et al. | | |
| 2008/0250664 | A1 | * | 10/2008 | Wise | .............................. | 33/770 |
| 2010/0050456 | A1 | * | 3/2010 | Huang | ........................... | 33/770 |

FOREIGN PATENT DOCUMENTS

GB 2452248 A 3/2009

* cited by examiner

*Primary Examiner* — G. Bradley Bennett
(74) *Attorney, Agent, or Firm* — Marjama Muldoon Blasiak & Sullivan LLP

(57) ABSTRACT

A tape measure endpiece is disclosed that can hook the measuring blade onto the edge of an object to be measured. The hooking member of the endpiece is positioned to avoid impacting the performance of the measuring blade when not using the hooking member to make measurements (e.g., when making different types of measurements and when stored). In one embodiment, the endpiece comprises a tab extending below the plane of the measuring blade, an arm extending from the tab beyond the edge of the measuring blade, and a hooking member extending from the end of the arm. In other embodiments, the endpiece further comprises a support that extends above the plane of the measuring blade, with the arm extending from the support and supporting the hooking member. In some embodiments, the arm and hooking member are moveable to allow greater flexibility in making measurements.

22 Claims, 9 Drawing Sheets

TAPE MEASURE ENDPIECE

FIELD OF THE INVENTION

The subject matter disclosed herein relates to endpieces for securing the free end of a measuring blade of a tape measure to an object.

BACKGROUND OF THE INVENTION

A tape measure 100 as shown in FIG. 1 is a well known device used to take measurements of an object (e.g., the length of an object). A tape measure 100 includes a housing 110 that contains a coiled length of a measuring blade 101 that extends from the housing 110 while taking measurements and retracts back into the housing 110 for storage after the measurement has been taken.

Since the distance to be measured by the tape measure 100 often exceeds the reach of the user and the user typically can only devote one hand to making the measurement (e.g., the other hand is holding a tool or writing device), the measuring blade 101 can be designed with a concave surface to allow the measuring blade 101 to remain rigid when it is extended over a large distance. The measuring blade can also be designed to have a conventional endpiece 106 on the free end of the measuring blade 101 to removably hook the free end of the measuring blade 101 onto the edge of an object to be measured. The conventional endpiece 106 can also stabilize the free end of the measuring blade 101 when pressed against the surface of an object to be measured. As shown in FIG. 1, the conventional endpiece 106 has a tab 108 that extends downward substantially perpendicular to the end of the measuring blade 101.

This tab 108 is also used to hook the measuring blade 101 onto the edge of an object while taking measurements. In many instances, however, the tab 108 is unable to remain hooked onto the edge of the object. This problem is especially prevalent when the measuring blade 101 is extended a long distance from the housing 110 of the tape measure 100 to make a measurement. The ineffectiveness of the tab 108 is caused, in part, by the fact that the tab 108 is too small (i.e., does not extend down far enough from the measuring blade 101) and therefore does not contact enough of the edge of the object. In addition, the ineffectiveness of the tab 108 is caused by the fact that that the tab 108 is flat and lacks a hooking member that extends from the end of the tab 108 below the measuring blade 101 back towards the housing 110 of the tape measure 100 to more effectively grasp the edge of an object. This hooking member would be especially useful for measuring objects that are thinner than the length of the tab 108 and would fit between the underside of the measuring blade 101 and the hooking member allowing for a more effective hooking of the object. While the drawbacks of the conventional endpiece 106 are known, there are other restrictions on the conventional endpiece 106 based on the fact that the tape measure 100 is used to measure a variety of objects that limit the potential sizes and shapes of the conventional endpiece 106.

For example, the conventional endpiece 106, including the tab 108, should be of a size and shape so as not to interfere with the ability of the free end of the measuring blade 101 to properly retract into the housing 110 of the tape measure 100. If the conventional endpiece 106 were to have a hooking member that extended directly above and parallel to the top surface of the measuring blade 101, that hooking member would contact the housing 110 and prevent that measuring blade 101 from properly retracting into the housing 110. A hooking member that extended directly above the top surface of the measuring blade 101 would also make measurements more difficult since it would be necessary, for some measurements, to turn the housing 110 over or upside down in order to hook onto the object to be measured, making it difficult to then lay the measuring blade 101 flat on the surface to be measured. In addition, the endpiece, including the tab 108, should be of a size and shape so as not to interfere with measurements of objects that do not have edges (e.g., the surface of a wall) or are very thick. If the tab 108 were to be too long, it would be difficult to place the free end onto the surface of the object to be measured as the measuring blade 101 would be far from the surface. Also, if the tab 108 were provided with a hooking member that extended from the end of the tab 108 below the measuring blade 101 back towards the housing 110 of the tape measure 100, this hooking member would distort measurements of objects with edges that were not thin enough to fit between the underside of the measuring blade 101 and the hooking member (i.e., the hooking member would prevent the actual end of the measuring blade 101 (the "true zero" point) from being placed on the edge of the object).

Given these restrictions on the conventional endpiece 106 based on the fact that the tape measure 100 is used to measure a variety of objects, some existing solutions address the deficiencies of the tab 108 by temporarily adding components (e.g., hooking members) for certain measurements and then removing (or changing) those components for other measurements. This requirement for using different endpieces 106 for different measurements, however, can be complicated and time consuming when several different measurements need to be performed on a regular basis.

It would be advantageous to provide an endpiece for a measuring blade 101 that improves upon the ability of the conventional endpiece 106 to hook the measuring blade 101 onto the edge of an object, and in particular, a relatively thin object, while taking measurements without impacting the ability of the measuring blade 101 to make accurate measurements when not using a hooking member to measure objects that do not have edges or that are relatively thick. It would also be advantageous to improve the ability of the conventional endpiece 106 without the need for having to add, remove, or change components of the conventional endpiece 106.

BRIEF DESCRIPTION OF THE INVENTION

A tape measure endpiece is disclosed that can hook the measuring blade onto the edge of an object to be measured. The hooking member of the endpiece is positioned to avoid impacting the performance of the measuring blade when not using the hooking member to make measurements (e.g., when making different types of measurements and when stored). In one embodiment, the endpiece comprises a tab extending below the plane of the measuring blade, an arm extending from the tab beyond the edge of the measuring blade, and a hooking member extending from the end of the arm. In other embodiments, the endpiece further comprises a support that extends above the plane of the measuring blade, with the arm extending from the support and supporting the hooking member. In some embodiments, the arm and hooking member are moveable to allow greater flexibility in making measurements.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Figure 1:
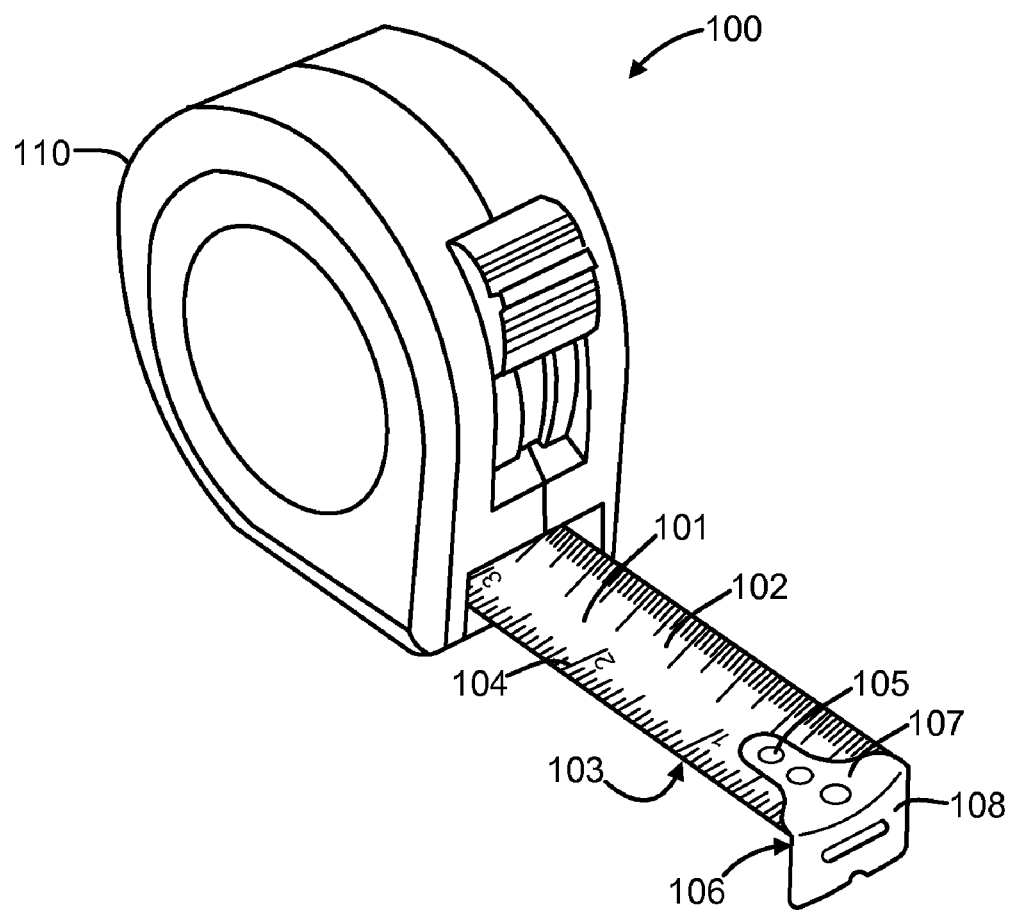
FIG. 1 is perspective view of a tape measure with a conventional endpiece attached to the free end of a measuring blade.

FIG. 1 is perspective view of a tape measure 100 with a conventional endpiece 106 attached to the free end of a measuring blade 101. The top surface 102 of the measuring blade 101 can include imprinted markings 104 (e.g., lines and numbers) corresponding to units of measure (e.g., inches, centimeters, etc.). As shown in FIG. 1, the conventional endpiece 106 has a mount 107 that extends along the top surface 102 of the measuring blade 101 and attaches the conventional endpiece 106 to the measuring blade 101 by rivets or other fasteners that pass from the top surface 102 to the bottom surface 103 of the measuring blade 101 through holes 105 in the mount 107 and in the measuring blade 101.

The conventional endpiece 106 also has a tab 108 that extends downward from the mount 107 substantially perpendicular to the end of the measuring blade 101. The tab 108 can be substantially the same width as the width of the measuring blade 101. It will be understood that there are several possible configurations of a tab 108 as shown in FIG. 1, which is included as a component in several of the inventive endpieces to be disclosed. Accordingly, the particular tab 108 shown in the figures is an illustrative example and does not limit the scope of the present invention, which can be used with a variety of tabs. Similarly, it will also be understood that there are several different ways of mounting an endpiece to a measuring blade 101. Accordingly, the use of a mount on the top surface 102 of the measuring blade 101 with rivets or other fasteners is an illustrative example and does not limit the scope of the present invention, which can be used with a variety of techniques of mounting the endpiece to the measuring blade 101 (e.g., using the bottom surface 103 of the measuring blade 101, using fasteners other than rivets, using a different quantity of rivets, etc.).

In order to describe several of the exemplary embodiments of the inventive endpieces to be discussed, it is useful to identify the various spatial relationships formed by the measuring blade 101 and the endpiece 106. For example, the measuring blade 101 shown in FIG. 1, having a top surface 102 and a bottom surface 103, can be understood to establish a measuring blade plane along the top surface 102 of the measuring blade 101 that extends horizontally beyond the edges of the measuring blade 101 (i.e., beyond the lengthwise edges of the measuring blade 101) while remaining coplanar with the top surface 102. Given that convention, the tab 108 of the conventional endpiece 106 would be considered to be below the measuring blade plane but not directly below the bottom surface 103 of the measuring blade 101. The mount 107, on the other hand, would be considered to be above the measuring blade plane and directly above the top surface 102 of the measuring blade 101. The lengthwise edges of the measuring blade 101 can be understood to establish two edges of the measuring blade 101 (e.g., a left edge and right edge).

Similarly, the tab 108 shown in FIG. 1 can be understood to establish an end plane that is substantially perpendicular to the end (i.e., the widthwise edge) of the measuring blade 101 (and the measuring blade plane). Given that convention, the mount 107 (and the housing 110) would be considered to be forward of the end plane while the tab 108 would be considered to be in the end plane. Any component that was on the side of the tab 108 opposite the mount 107 would be considered to be rearward of the end plane. The end of the measuring blade 101 can be considered to be at the "true zero" point of the measuring blade 101. The conventional endpiece 106 should be configured to ensure that the tab 108 is positioned such that the first point of the object to be measured (e.g., edge) is located at the "true zero" point of the measuring blade 101 to allow for an accurate measurement.

In the conventional endpiece 106, the holes 105 of the mount 107 and the rivets or other fasteners that pass from through the measuring blade 101 can work together to allow the conventional endpiece 106 to move forward or rearward when placed in contact with an object be measured to ensure that the tab 108 is positioned such that the object is measured from the "true zero" point of the measuring blade 101. For example, if the rearward face of the tab 108 of the conventional endpiece 106 is pressed against the surface of the object to be measured, the conventional 106 endpiece and the tab 108 (and therefore the end plane) can move forward to have the surface of the object measured from the "true zero" point of the measuring blade 101. Similarly, if the forward face of the tab 108 of the conventional endpiece 106 is pulled forward against the edge of the surface of the object to be measured (e.g., to hook onto the edge), the conventional endpiece 106 and the tab 108 (and therefore the end plane) can move rearward to have the surface of the object measured from the "true zero" point of the measuring blade 101.

Figure 2A:
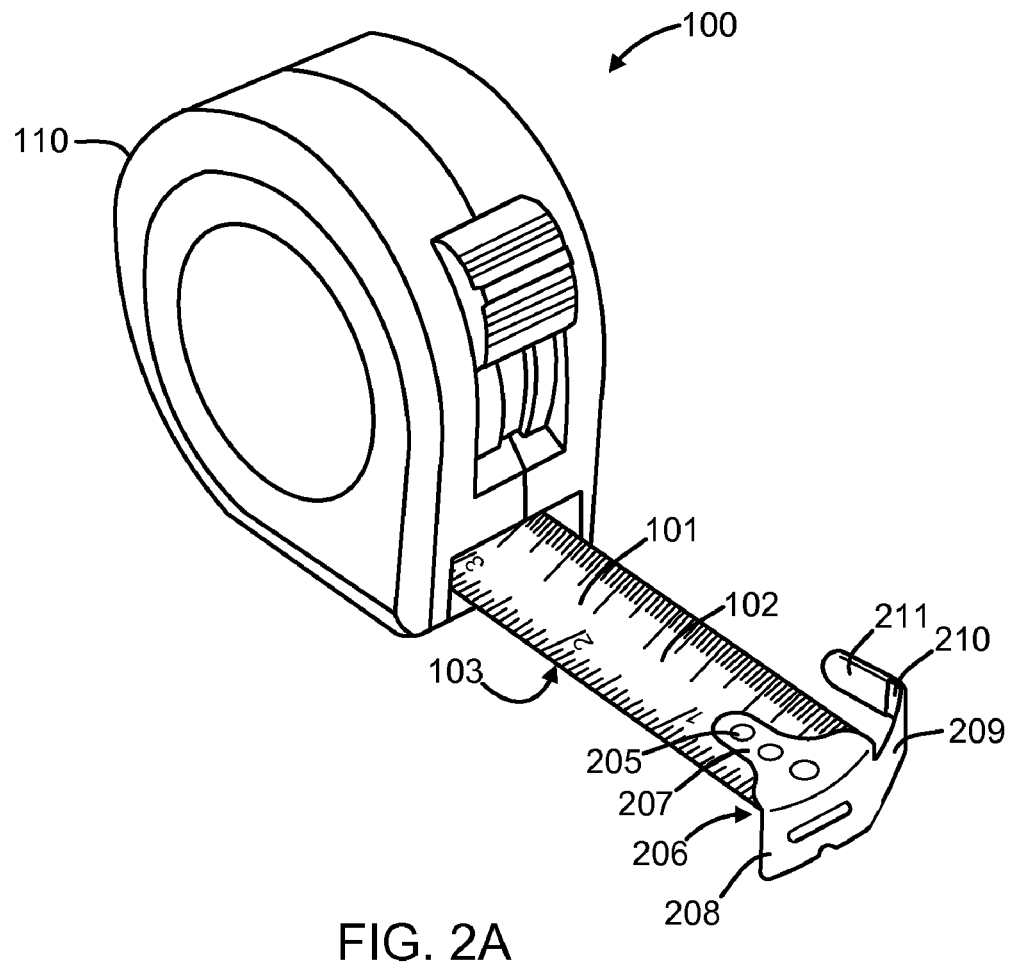
FIG. 2A is a perspective view of a tape measure with an endpiece attached to the free end of a measuring blade in one exemplary embodiment of the invention.
Figure 2B:
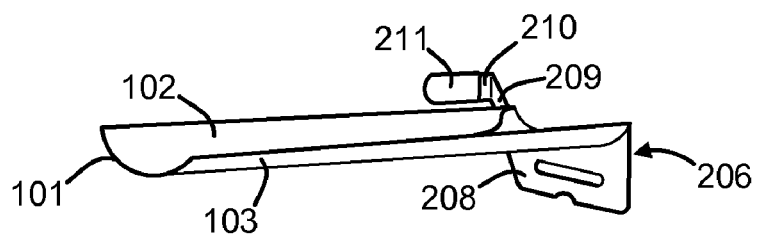
FIG. 2B is a perspective view of the endpiece shown in FIG. 2A attached to the free end of a measuring blade in one exemplary embodiment of the invention.

FIG. 2A is a perspective view of a tape measure 100 with an endpiece 206 attached to the free end of a measuring blade 101 in one exemplary embodiment of the invention. FIG. 2B is a perspective view of the endpiece 206 shown in FIG. 2A attached to the free end of a measuring blade 101 in one exemplary embodiment of the invention. The endpiece 206 can have a mount 207 that extends along the top surface 102 of the measuring blade 101 and can attach the endpiece 206 to the measuring blade 101 by rivets or other fasteners that can pass from the top surface 102 to the bottom surface 103 of the measuring blade 101 through holes 205 in the mount 207 and in the measuring blade 101.

The endpiece 206 can have a tab 208 extending downward from the mount 207 in the end plane below the measuring blade plane. The tab 208 can be substantially the same width as the width of the measuring blade 101. The endpiece 206 can have an arm 209 extending from one edge of the tab 208 in the end plane beyond a lengthwise edge of the measuring blade 101. The arm 209 can extend diagonally from the tab 208 in the end plane from a point below the measuring blade plane to a point above the measuring blade plane. The end piece 206 can have a hooking member 210 extending from the end of the arm 209 forward of and substantially perpendicular to the end plane. The hooking member 210 can be located in a position where it is not directly above the top surface 102 of the measuring blade 101. The end piece 206 can have a protective cover 211 (e.g., made of plastic, rubber, or another suitable material) covering all or at least a portion of the hooking member 210. All or at least a portion of the endpiece 206 can be magnetized to facilitate attachment to metallic objects.

As can be seen in FIGS. 2A and 2B, the length of the arm 209 can determine the width between a lengthwise edge of the measuring blade 101 and the hooking member 210. This width between a lengthwise edge of the measuring blade 101 and the hooking member 210 can be selected to provide sufficient space for the free end of the measuring blade 101 to properly retract into the housing 110 of the tape measure 100 without having the hooking member 210 or any other component of the endpiece 206 interfere with the housing 110. It will be understood that the hooking member 210 and housing 110 can be configured to avoid interference regardless of whether the hooking member 210 were to retract outside of the housing 110 (as in the embodiment shown in FIG. 2A) or inside of the housing 110 designed to receive the hooking member 210. This width between a lengthwise edge of the measuring blade 101 and the hooking member 210 can also be selected to provide sufficient space for the endpiece 206 to hook around the width of the edge of an object to be measured (e.g., wall of a pipe or conduit, drywall, plywood, etc.).

Figure 3:
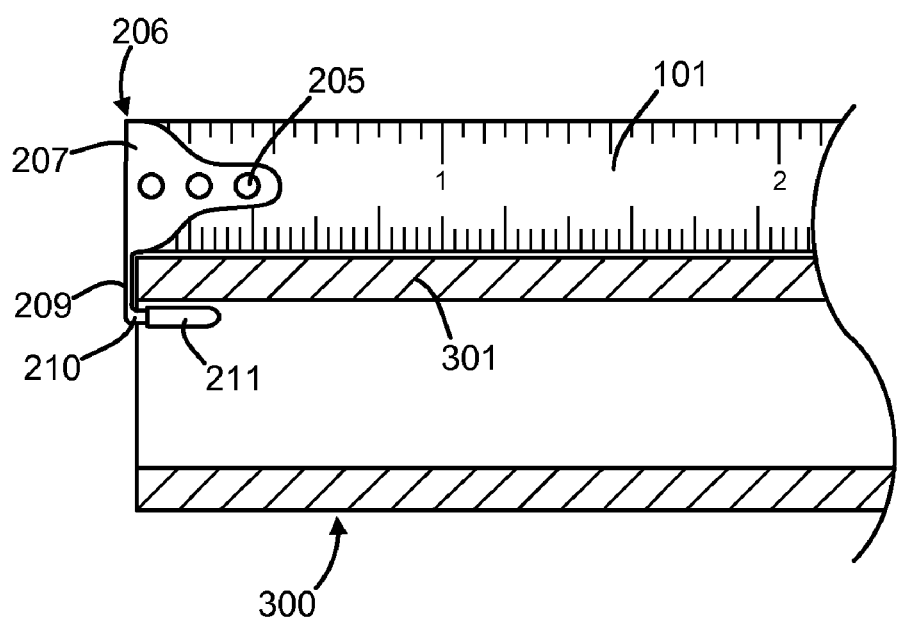
FIG. 3 is a cross-section view of the endpiece shown in FIG. 2A attached to the free end of a measuring blade hooked onto the wall of a pipe in one exemplary embodiment of the invention.

FIG. 3 is a cross-section view of the endpiece 206 shown in FIG. 2A attached to the free end of a measuring blade 101 hooked onto the wall 301 of a pipe 300 in one exemplary embodiment of the invention. The endpiece 206, with its arm 209 and hooking member 210, effectively grasps the end of the wall 301 of the pipe 300, reducing or eliminating the possibility that the endpiece 206 will be inadvertently dislodged during a measurement, regardless of the length that the measuring blade 101 is extended. Since the width of the wall 301 of the pipe is narrower than the width between a lengthwise edge of the measuring blade 101 and the hooking member 210, the arm 209 of the endpiece can rest against the end of the wall 301 of the pipe 300.

As can be seen in FIG. 3, if the rivets or other fasteners that attach the endpiece to the measuring blade create a relatively loose connection (e.g., the endpiece can slide from side to side on measuring blade), the arm when endpiece is pressed again the edge of the object to be measured may no longer be at the "true zero" point of the measuring blade 101. In some embodiments where the attachment between the endpiece and the measuring blade is not sufficiently rigid, it may be necessary to change the thickness of the arm (e.g., make it thicker) or the angle of the arm (i.e., angle it forward of the end plane) so that when the endpiece is pressed against the edge of the object to be measured it remains at the "true zero" point of the measuring blade 101.

Figure 4A:
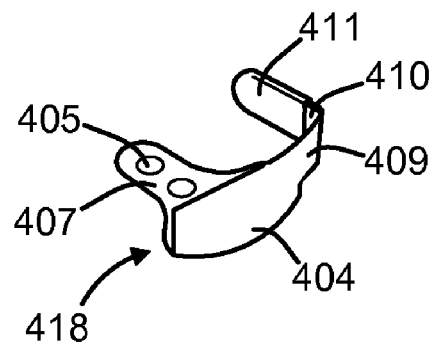
FIGS. 4A and 4B are perspective views of an endpiece in another exemplary embodiment of the invention.
Figure 4B:
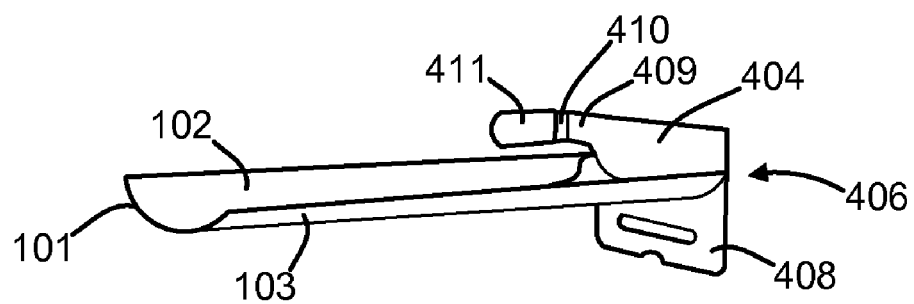

FIGS. 4A and 4B are perspective views of an endpiece 406 in another exemplary embodiment of the invention. FIG. 4A shows the top part 418 of the endpiece 406 from one perspective prior to attachment to the measuring blade 101, while FIG. 4B shows the endpiece 406 from a different perspective after attachment to the measuring blade 101. FIG. 4A shows the top part 418 of the endpiece 406 without a tab 408, while FIG. 4B shows the endpiece 406 with a tab 408. The tab 408 may be an integral part of the endpiece 406, or the endpiece 406 and tab 408 may be separately connected to the measuring blade 101.

The endpiece 406 can have a mount 407 that extends along the top surface 102 of the measuring blade 101 and can attach the endpiece 406 to the measuring blade 101 by rivets or other fasteners that can pass from the top surface 102 to the bottom surface 103 of the measuring blade 101 through holes 405 in the mount 407 and in the measuring blade 101. The endpiece 406 can have a tab 408 extending downward from the mount 407 in the end plane below the measuring blade plane. The tab 408 can be substantially the same width as the width of the measuring blade 101.

The endpiece 406 can have a support 404 extending upward from the mount 407 in the end plane above the measuring plane. The support 404 can be substantially the same width as the width of the measuring blade 101. In one embodiment, the support 404 can be a plate. The endpiece 406 can have an arm 409 extending from one edge of the support 404 in the end plane beyond a lengthwise edge of the measuring blade 101. The arm 409 can extend horizontally from the support 404 in the end plane remaining above the measuring blade plane. The end piece 406 can have a hooking member 410 extending from the end of the arm 409 forward of and substantially perpendicular to the end plane. The hooking member 410 can be located in a position where it is not directly above the top surface 102 of the measuring blade 101. The end piece 406 can have a protective cover 411 (e.g., made of plastic, rubber, or another suitable material) covering all or at least a portion of the hooking member 410. All or at least a portion of the endpiece 406 can be magnetized to facilitate attachment to metallic objects.

Figure 9A:
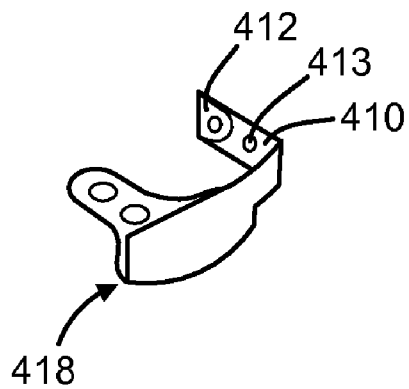
FIGS. 9A and 9B are perspective view of the endpiece shown in FIGS. 4A and 4B with the protective cover removed from the hooking member in one exemplary embodiment of the invention.
Figure 9B:
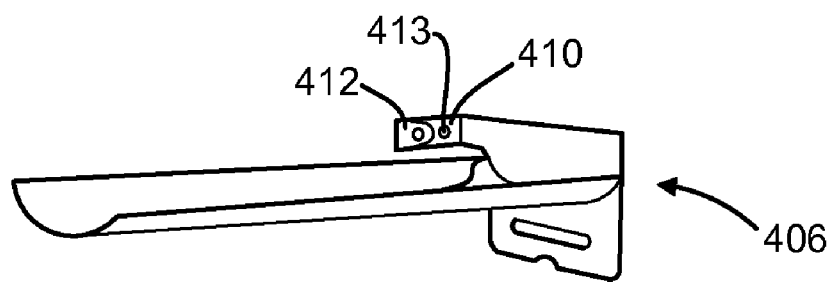

FIGS. 9A and 9B are perspective view of the endpiece shown in FIGS. 4A and 4B with the protective cover 411 removed from the hooking member 410 in one exemplary embodiment of the invention. In order to avoid any sharp edges to decrease the risk of harm to the user or to the protective cover, the end 412 of the hooking member 410 can be rounded and folded over. In addition, holes 413 may be included in the hooking member 410 to make the hooking member 410 lighter and more balanced. This design of the hooking member 410 can be used in the any of the embodiments of the invention.

Returning to FIGS. 4A and 4B, the length of the arm 409 can determine the width between a lengthwise edge of the measuring blade 101 and the hooking member 410. This width between a lengthwise edge of the measuring blade 101 and the hooking member 410 can be selected to provide sufficient space for the free end of the measuring blade 101 to properly retract into the housing 110 of the tape measure 100 (shown in FIG. 2A) without having the hooking member 410 or any other component of the endpiece 406 interfere with the housing 110. This width between a lengthwise edge of the measuring blade 101 and the hooking member 410 can also be selected to provide sufficient space for the endpiece 406 to hook around the width of the edge of an object to be measured.

Figure 5A:
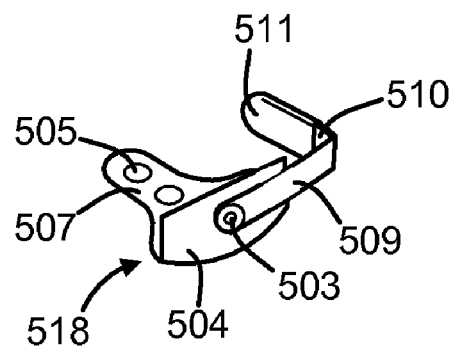
FIGS. 5A and 5B are perspective views of an endpiece in an additional exemplary embodiment of the invention.
Figure 5B:
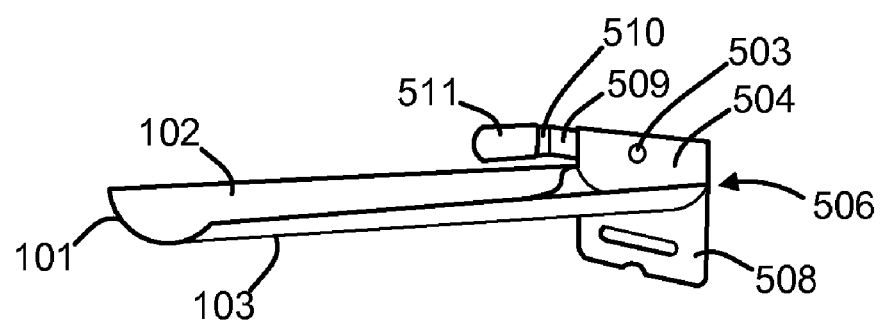

FIGS. 5A and 5B are perspective views of an endpiece 506 in another exemplary embodiment of the invention. FIG. 5A shows the top part 518 of the endpiece 506 from one perspective prior to attachment to the measuring blade 101, while FIG. 5B shows the endpiece 506 from a different perspective after attachment to the measuring blade 101. FIG. 5A shows the top part 518 of the endpiece 506 without a tab 508, while FIG. 5B shows the endpiece 506 with a tab 508. The tab 508 may be an integral part of the endpiece 506, or the endpiece 506 and tab 508 may be separately connected to the measuring blade 101.

The endpiece 506 can have a mount 507 that extends along the top surface 102 of the measuring blade 101 and can attach the endpiece 506 to the measuring blade 101 by rivets or other fasteners that can pass from the top surface 102 to the bottom surface 103 of the measuring blade 101 through holes 505 in the mount 507 and in the measuring blade 101. The endpiece 506 can have a tab 508 extending downward from the mount 507 in the end plane below the measuring blade plane. The tab 508 can be substantially the same width as the width of the measuring blade 101.

The endpiece 506 can have a support 504 extending upward from the mount 507 above the measuring plane. The support 504 can be substantially the same width as the width of the measuring blade 101. The endpiece 506 can have an arm 509 fastened to the support 504 with a fastener 503 (e.g., rivet, screw and nut, etc.) and extending from the fastener 503 beyond a lengthwise edge of the measuring blade 101. The end piece 506 can have a hooking member 510 extending from the end of the arm 509 forward of and substantially perpendicular to the end plane. The end piece 506 can have a protective cover 511 (e.g., made of plastic, rubber, or another suitable material) covering all or at least a portion of the hooking member 510. All or at least a portion of the endpiece 506 can be magnetized to facilitate attachment to metallic objects.

In one embodiment where the tab 508 is an integral part of the endpiece 506, in order for the arm 509 and tab 508 to be located in the end plane such that they can be located at the "true zero" point of the measuring blade 101, the support 504 can be located slightly forward of the tab 508 such that the arm 509 when fastened to the support 504 is located in the end plane. In another embodiment where the tab 508 is an integral part of the endpiece 506 and where the support 504 is located in the end plane, in order for the arm 509 to also be located in the end plane such that it is located at the "true zero" point of the measuring blade 101, a portion of the arm 509 that extends beyond the support 504 may be thickened or otherwise configured such that the arm 509 is coplanar with the support 504 in the end plane.

The fastener 503 can allow the arm 509 to rotate about the fastener 503. In the exemplary embodiment shown in FIGS. 5A and 5B, the fastener 503 is positioned near the center of the support 504 and the arm 509 is of a length sufficient to allow the arm 509 to rotate 360° about the support 504, allowing the hooking member 510 to be positioned on both sides of the measuring blade plane and on both lengthwise edges of the measuring blade 101. In another embodiment, a stopper (not shown) can be included on the support 504 to limit the rotation of the arm 509 and hooking member 510. In yet another embodiment, rather than in the center, the fastener 503 can be positioned toward one edge of the support 504, potentially limiting the use of the hooking member 510 to that one edge of the measuring blade 101.

The rotation of the arm 509 and hooking member 510 about the support 504 increases the flexibility of the endpiece 506 to hook onto the edges of objects to be measured at a variety of angles. After the measurement is performed, the arm 509 can be positioned (e.g., to the side) to provide sufficient space for the free end of the measuring blade 101 to properly retract into the housing 110 of the tape measure 100 (shown in FIG. 2A) without having the hooking member 510 or any other component of the endpiece 506 interfere with the housing 110.

Figure 6A:
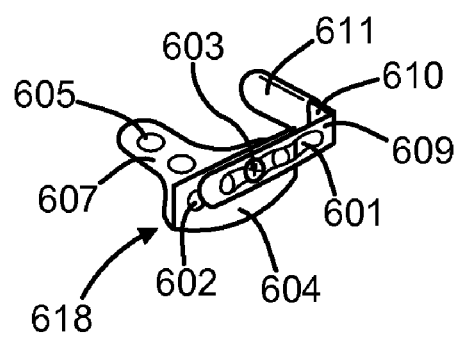
FIGS. 6A and 6B are perspective views of an endpiece in a further exemplary embodiment of the invention.
Figure 6B:
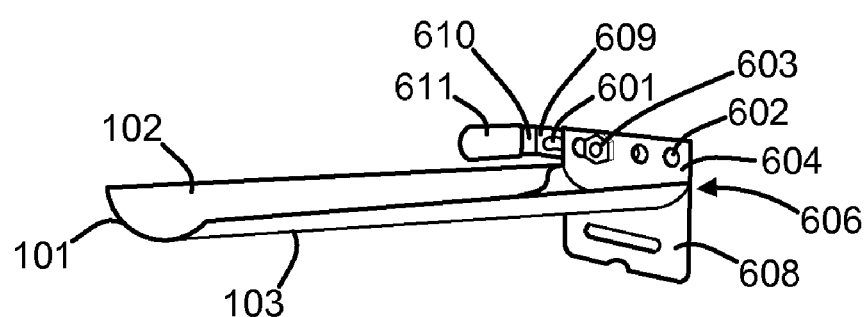

FIGS. 6A and 6B are perspective views of an endpiece 606 in another exemplary embodiment of the invention. FIG. 6A shows the top part 618 of the endpiece 606 from one perspective prior to attachment to the measuring blade 101, while FIG. 6B shows the endpiece 606 from a different perspective after attachment to the measuring blade 101. FIG. 6A shows the top part 618 of the endpiece 606 without a tab 608, while FIG. 6B shows the endpiece 606 with a tab 608. The tab 608 may be an integral part of the endpiece 606, or the endpiece 606 and tab 608 may be separately connected to the measuring blade 101.

The endpiece 606 can have a mount 607 that extends along the top surface 102 of the measuring blade 101 and can attach the endpiece 606 to the measuring blade 101 by rivets or other fasteners that can pass from the top surface 102 to the bottom surface 103 of the measuring blade 101 through holes 605 in the mount 607 and in the measuring blade 101. The endpiece 606 can have a tab 608 extending downward from the mount 607 in the end plane below the measuring blade plane. The tab 608 can be substantially the same width as the width of the measuring blade 101.

The endpiece 606 can have a support 604 extending upward from the mount 607 above the measuring plane. The support 604 can be substantially the same width as the width of the measuring blade 101. The endpiece 606 can have an arm 609 fastened to the support 604 with one or more fasteners 603 (e.g., rivets, screws and nuts, etc.) and extending from the fasteners 603 for a length sufficient to exceed the width of the support 604. The fasteners 603 can extend through a slot 601 in the arm 609 and a hole 602 in the support 604. The end piece 606 can have a hooking member 610 extending from the end of the arm 609 forward of and substantially perpendicular to the end plane. The end piece 606 can have a protective cover 611 (e.g., made of plastic, rubber, or another suitable material) covering all or at least a portion of the hooking member 610. All or at least a portion of the endpiece 606 can be magnetized to facilitate attachment to metallic objects.

In one embodiment where the tab 608 is an integral part of the endpiece 606, in order for the arm 609 and the tab 608 to be located in the end plane such that they can be located at the "true zero" point of the measuring blade 101, the support 604 can be located slightly forward of the tab 608 such that the arm 609 when fastened to the support 604 is located in the end plane. In another embodiment where the tab 608 is an integral part of the endpiece 606 and where the support 604 is located in the end plane, in order for the arm 609 to also be located in the end plane such that it is located at the "true zero" point of the measuring blade 101, a portion of the arm 609 that extends beyond the support 604 may be thickened or otherwise configured such that it is coplanar with the support 604 in the end plane.

The fasteners 603 can be adjusted to adjust the arm 609 to different lengths beyond the support 604. The slot 601 can be configured to be straight or curved. The ability to adjust the arm horizontally 609 to different lengths beyond the support 604 increases the flexibility of the endpiece 606 to hook onto the edges of objects of different widths. After the measurement is performed, the arm 609 can be positioned (e.g., to the side) to provide sufficient space for the free end of the measuring blade 101 to properly retract into the housing 110 of the tape measure 100 (shown in FIG. 2A) without having the hooking member 610 or any other component of the endpiece 606 interfere with the housing 110.

Figure 7A:
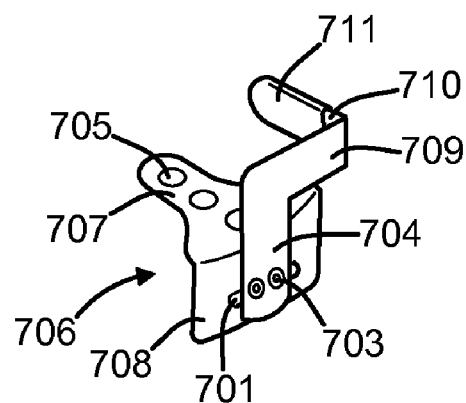
FIGS. 7A and 7B are perspective views of an endpiece in a still further exemplary embodiment of the invention.
Figure 7B:
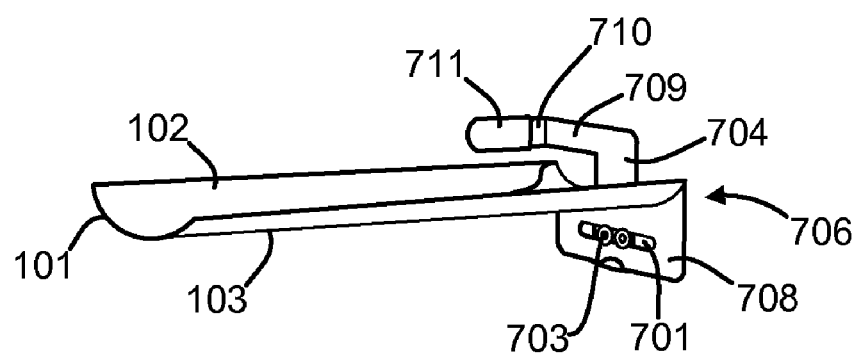

FIGS. 7A and 7B are perspective views of an endpiece 706 in a still further exemplary embodiment of the invention. FIG. 7A shows the endpiece 706 from one perspective prior to attachment to the measuring blade 101, while FIG. 7B shows the endpiece 706 from a different perspective after attachment to the measuring blade 101.

The endpiece 706 can have a mount 707 that extends along the top surface 102 of the measuring blade 101 and can attach the endpiece 706 to the measuring blade 101 by rivets or other fasteners that can pass from the top surface 102 to the bottom surface 103 of the measuring blade 101 through holes 705 in the mount 707 and in the measuring blade 101. The endpiece 706 can have a tab 708 extending downward from the mount 707 in the end plane below the measuring blade plane. The tab 708 can be substantially the same width as the width of the measuring blade 101.

The endpiece 706 can have a support 704 fastened to the tab 708 with one or more fasteners 703 (e.g., rivets, screws and nuts, etc.) and extending upward from the fasteners 703 for a length sufficient to exceed the height of the tab 708 and to be above the measuring blade plane. The support 704 can have a smaller width than the width of the tab 708. The fasteners 703 can extend through holes in the support 704 and a slot 701 in the tab 708. In another embodiment, the support 704 can be an integral part of, and extend upward from, the tab 708.

The endpiece can have an arm 709 extending from one edge of the support 704 beyond a lengthwise edge of the measuring blade 101 above the measuring blade plane. The end piece 706 can have a hooking member 710 extending from the end of the arm 709 forward of and substantially perpendicular to the end plane. The hooking member 710 can be located in a position where it is not directly above the top surface 102 of the measuring blade 101. The end piece 706 can have a protective cover 711 (e.g., made of plastic, rubber, or another suitable material) covering all or at least a portion of the hooking member 710. All or at least a portion of the endpiece 706 can be magnetized to facilitate attachment to metallic objects.

In one embodiment, in order for the arm 709 to be located in the end plane such that it is located at the "true zero" point of the measuring blade 101, a portion of the support 704 that extends above the tab 708 or the arm 709 may be thickened or otherwise configured such that the arm 709 is coplanar with the tab 708 in the end plane.

The fasteners 703 can be located at different points in the slot 701 of the tab 708 to adjust the position of the support 704, arm 709, and hooking member 710 horizontally by moving the support 704 from side to side. This movement of the hooking member 710 increases the flexibility of the endpiece 706 to hook onto the edges of objects of different widths. After the measurement is performed, the support 704 can be positioned (e.g., to the side) to provide sufficient space for the free end of the measuring blade 101 to properly retract into the housing 110 of the tape measure 100 (shown in FIG. 2) without having the hooking member 710 or any other component of the endpiece 706 interfere with the housing 110.

Figure 8A:
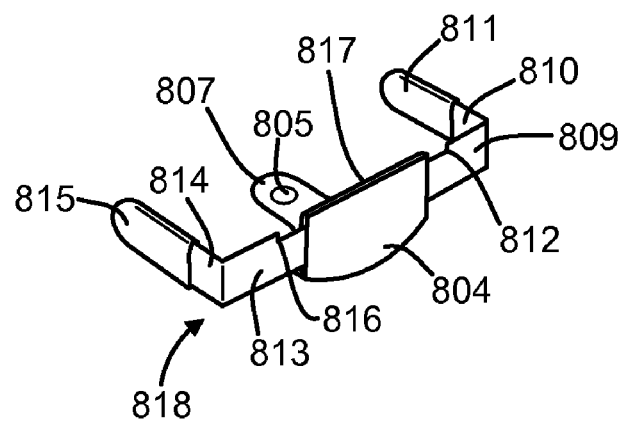
FIGS. 8A and 8B are perspective views of an endpiece in a yet further exemplary embodiment of the invention.
Figure 8B:
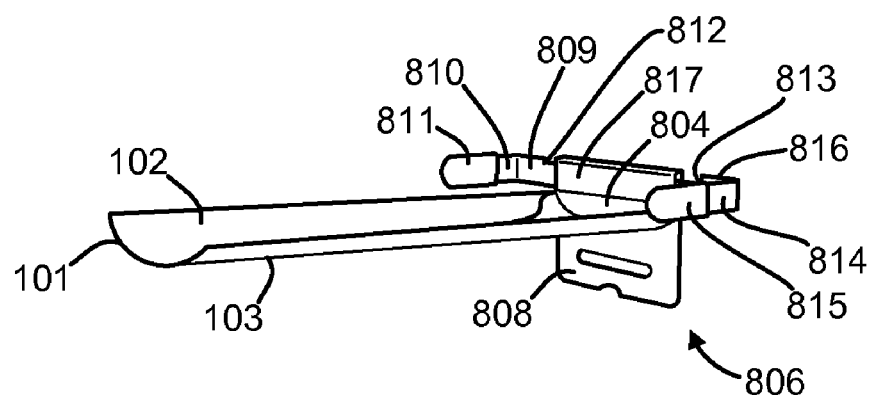

FIGS. 8A and 8B are perspective views of an endpiece 806 in another exemplary embodiment of the invention. FIG. 8A shows the top part 818 of the endpiece 806 from one perspective prior to attachment to the measuring blade 101, while FIG. 8B shows the endpiece 806 from a different perspective after attachment to the measuring blade 101. FIG. 8A shows the top part 818 of the endpiece 806 without a tab 808, while FIG. 8B shows the endpiece 806 with a tab 808. The tab 808 may be an integral part of the endpiece 806, or the endpiece 806 and tab 808 may be separately connected to the measuring blade 101.

The endpiece 806 can have a mount 807 that extends along the top surface 102 of the measuring blade 101 and can attach the endpiece 806 to the measuring blade 101 by rivets or other fasteners that can pass from the top surface 102 to the bottom surface 103 of the measuring blade 101 through holes 805 in the mount 807 and in the measuring blade 101. The endpiece 806 can have a tab 808 extending downward from the mount 807 in the end plane below the measuring blade plane. The tab 808 can be substantially the same width as the width of the measuring blade 101.

The endpiece 806 can have a support 804 extending upward from the mount 807 above the measuring plane. The support 804 can be substantially the same width as the width of the measuring blade 101. The endpiece 806 can have a first arm 809 and a second arm 813 extending through and secured by a flap 817 on the support 804 for a length sufficient to exceed the width of the support 804. The first arm 809 and second arm 813 can have a first stopper 812 and second stopper 816, respectively, that limit the movement of the arm 809 with respect to the flap 817. The end piece 806 can have a first hooking member 810 extending from the end of the first arm 809 and a second hooking member 814 extending from the end of the second arm 813, with both hooking members 810, 814 forward of and substantially perpendicular to the end plane. The end piece 806 can have a first protective cover 811 and second protective cover 815 (e.g., made of plastic, rubber, or another suitable material) covering all or at least a portion of the first hooking member 810 and second hooking member 814. All or at least a portion of the endpiece 806 can be magnetized to facilitate attachment to metallic objects.

In one embodiment where the tab 808 is an integral part of the endpiece 806, in order for the arm 809 and the tab 808 to be located in the end plane such that they can be located at the "true zero" point of the measuring blade 101, a portion of the support 804 can be located slightly rearward of the tab 808 such that the arm 809 when secured by the flap 817 in the support 804 is located in the end plane. In another embodiment where the tab 808 is an integral part of the endpiece 806 and where the support 804 is located in the end plane, in order for the arm 809 to also be located in the end plane such that it is located at the "true zero" point of the measuring blade 101, a portion of the arm 809 that extends beyond the support 804 may be configured such that it is coplanar with the support 804 in the end plane.

The arm 809 can be located at different positions within the flap 817 of the support 804 to adjust the position of the hooking members horizontally 810, 814 by moving the arm 809 from side to side. This movement of the hooking members 810, 814 increases the flexibility of the endpiece 806 to hook onto the edges of objects of different widths. After the measurement is performed, the arm 809 can be positioned (e.g., to the center) to provide sufficient space for the free end of the measuring blade 101 to properly retract into the housing 110 of the tape measure 100 (shown in FIG. 2) without having the hooking members 810, 814 or any other component of the endpiece 806 interfere with the housing 110.

In several of the exemplary embodiments of the invention, the arm is located in the end plane established by the tab of the measuring blade 101. As was the case with the conventional endpiece 106 discussed previously, the inventive endpieces of the invention can be configured to ensure that the arm is positioned such that the first point of the object to be measured (e.g., edge) is located at the "true zero" point of the measuring blade 101 to allow for an accurate measurement. If the top part of the endpiece is mounted separately from the tab, the holes of the mount and the rivets or other fasteners that pass from through the measuring blade 101 can work together to allow the top part of the endpiece to move forward or rearward when placed in contact with an object be measured to ensure that the arm is positioned such that the object is measured from the "true zero" point of the measuring blade 101. Accordingly, the edge of any object to be measured that contacts the arm will also be located at the "true zero" point of the measuring blade 101.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

For example, while some exemplary embodiments show the endpiece as a single piece, it will be understood that in other embodiments, the different components making up the endpiece can be separate and then assembled and fastened together to form the endpiece. Similarly, while some exemplary embodiments show the hooking member on one edge of the measuring blade (e.g., the right edge), it will be understood that the hooking member (and related components) can instead be provided on the other edge of the measuring blade (i.e., the left edge). Likewise, while some exemplary embodiments show the hooking member above the measuring blade plane, it will be understood that the hooking member (and related components) could be located below the measuring blade plane. Furthermore, while some exemplary embodiments show a hooking member on only one edge of the measuring blade, it will be understood that a second hooking member (and related components) can also be provided on the other edge of the measuring blade as well.

What is claimed is:

1. A tape measure endpiece for attachment to a measuring blade comprising:
    a mount for attaching the tape measure endpiece to the measuring blade;
    a tab extending downward from the mount below the plane of the measuring blade, wherein the tab is located in an end plane that is substantially perpendicular to the free end of the measuring blade;
    a first arm extending from a first edge of the tab beyond a first lengthwise edge of the measuring blade in the end plane; and
    a first hooking member extending from the end of the first arm substantially perpendicular to the end plane.

2. The tape measure endpiece of claim 1, wherein the first arm extends diagonally from below the plane of the measuring blade to above the plane of the measuring blade.

3. The tape measure endpiece of claim 1, further comprising:
    a second arm extending from a second edge of the tab, opposite of the first edge of the tab, beyond a second lengthwise edge of the measuring blade in the end plane; and
    a second hooking member extending from the end of the second arm substantially perpendicular to the end plane.

4. The tape measure endpiece of claim 1, wherein the first hooking member extends above the plane of the measuring blade.

5. A tape measure endpiece comprising:
    a mount for attaching the tape measure endpiece to the measuring blade;
    a tab extending downward from the mount below the plane of the measuring blade, wherein the tab is located in an end plane that is substantially perpendicular to the free end of the measuring blade;
    a support extending upward from the tab above the plane of the measuring blade;
    a first arm extending from a first edge of the support beyond a first lengthwise edge of the measuring blade in the end plane; and
    a first hooking member extending from the end of the first arm substantially perpendicular to the end plane.

6. The tape measure endpiece of claim 5, wherein the support is attached to the tab with a fastener.

7. The tape measure endpiece of claim 6, wherein the tab further comprises a slot, and wherein the support is attached to the tab with a fastener that extends through a hole in the support and the slot of the tab.

8. The tape measure endpiece of claim 5, further comprising:
    a second arm extending from a second edge of the support, opposite of the first edge of the support, beyond a second lengthwise edge of the measuring blade in the end plane; and
    a second hooking member extending from the end of the second arm substantially perpendicular to the end plane.

9. A tape measure endpiece comprising:
    a mount for attaching the tape measure endpiece to the measuring blade;
    a tab extending downward from the mount below the plane of the measuring blade, wherein the tab is located in an end plane that is substantially perpendicular to the free end of the measuring blade;
    a support extending upward from the mount above the plane of the measuring blade;
    a first arm extending from the support beyond a first lengthwise edge of the measuring blade in the end plane; and
    a first hooking member extending from the end of the first arm substantially perpendicular to the end plane.

10. The tape measure endpiece of claim 9, wherein the first arm extends from a first edge of the support.

11. The tape measure endpiece of claim 9, wherein the first arm is attached to the support with a fastener.

12. The tape measure endpiece of claim 11, wherein the first arm is attached to the support with a fastener to allow the first arm and the first hooking member to rotate in the end plane.

13. The tape measure endpiece of claim 11, wherein the first arm further comprises a slot, and wherein the first arm is attached to the support with a fastener that extends through a hole in the support and the slot of the first arm to allow the first arm and the first hooking member to move horizontally in the end plane.

14. The tape measure endpiece of claim 9, wherein the support further comprises a flap, and wherein the first arm extends through and is secured by the flap to allow the first arm and the first hooking member to move horizontally in the end plane.

15. The tape measure endpiece of claim 14, further comprising:
- a second arm extending from the support beyond a second lengthwise edge of the measuring blade in the end plane; and
- a second hooking member extending from the end of the second arm substantially perpendicular to the end plane,
- wherein the second arm extends through and is secured by the flap to allow the second arm and the second hooking member to move horizontally in the end plane.

16. A tape measure endpiece comprising:
- a first mount for attaching the tape measure endpiece to the measuring blade;
- a tab extending downward from the first mount below the plane of the measuring blade, wherein the tab is located in an end plane that is substantially perpendicular to the free end of the measuring blade;
- a second mount for attaching the tape measure endpiece to the measuring blade;
- a support extending upward from the second mount above the plane of the measuring blade;
- a first arm extending from the support beyond a first lengthwise edge of the measuring blade in the end plane; and
- a first hooking member extending from the end of the first arm substantially perpendicular to the end plane.

17. The tape measure endpiece of claim 16, wherein the first arm extends from a first edge of the support.

18. The tape measure endpiece of claim 16, wherein the first arm is attached to the support with a fastener.

19. The tape measure endpiece of claim 18, wherein the first arm is attached to the support with a fastener to allow the first arm and the first hooking member to rotate in the end plane.

20. The tape measure endpiece of claim 18, wherein the first arm further comprises a slot, and wherein the first arm is attached to the support with a fastener that extends through a hole in the support and the slot of the first arm to allow the first arm and the first hooking member to move horizontally in the end plane.

21. The tape measure endpiece of claim 16, wherein the support further comprises a flap, and wherein the first arm extends through and is secured by the flap to allow the first arm and the first hooking member to move horizontally in the end plane.

22. The tape measure endpiece of claim 21, further comprising:
- a second arm extending from the support beyond a second lengthwise edge of the measuring blade in the end plane; and
- a second hooking member extending from the end of the second arm substantially perpendicular to the end plane,
- wherein the second arm extends through and is secured by the flap to allow the second arm and the second hooking member to move horizontally in the end plane.

* * * * *